Jan. 20, 1959  E. E. FOSTER  2,869,801
SPRING MOTOR
Filed Feb. 18, 1957  2 Sheets-Sheet 1
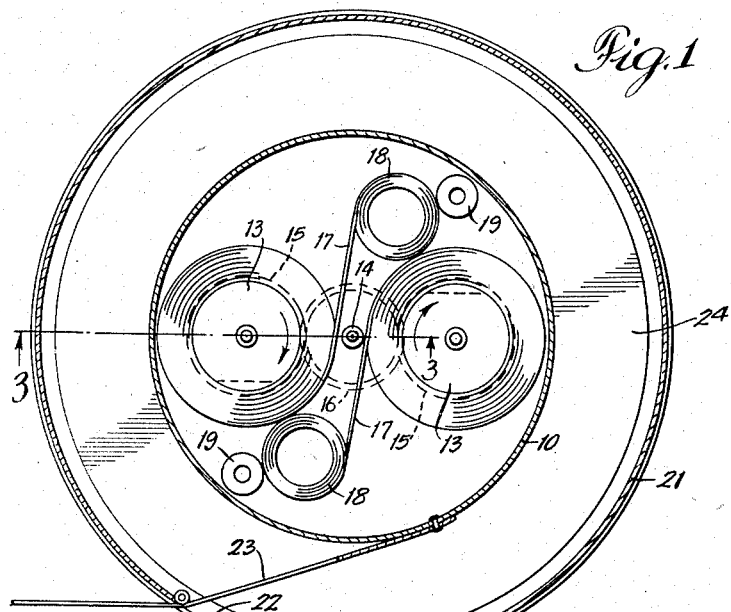
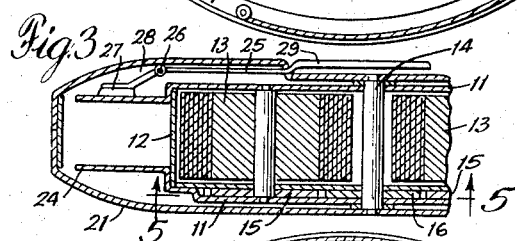
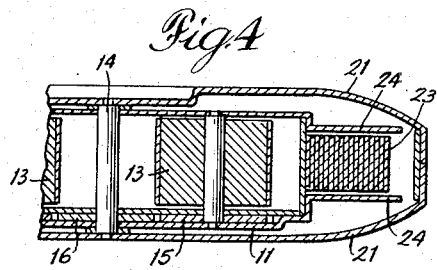
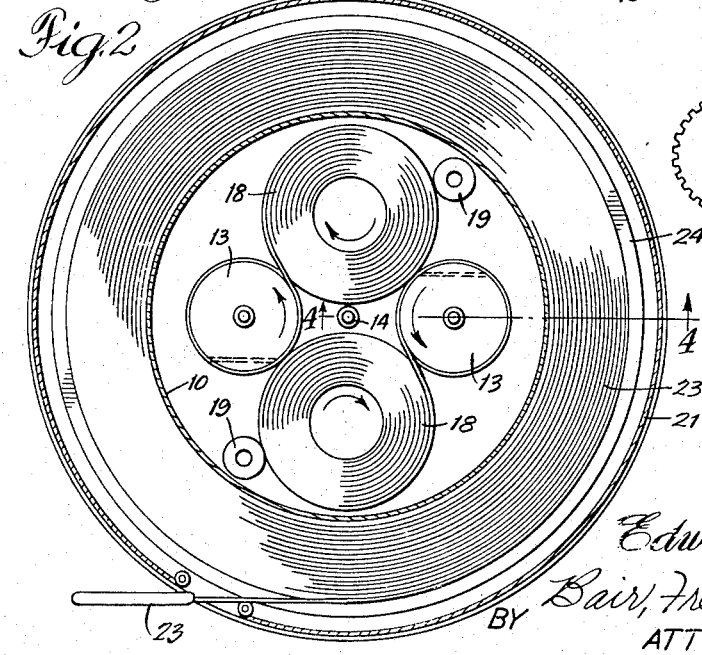
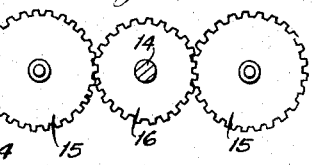
INVENTOR:
Edwin E. Foster,
BY Bair, Freeman & Molinare
ATTORNEYS.

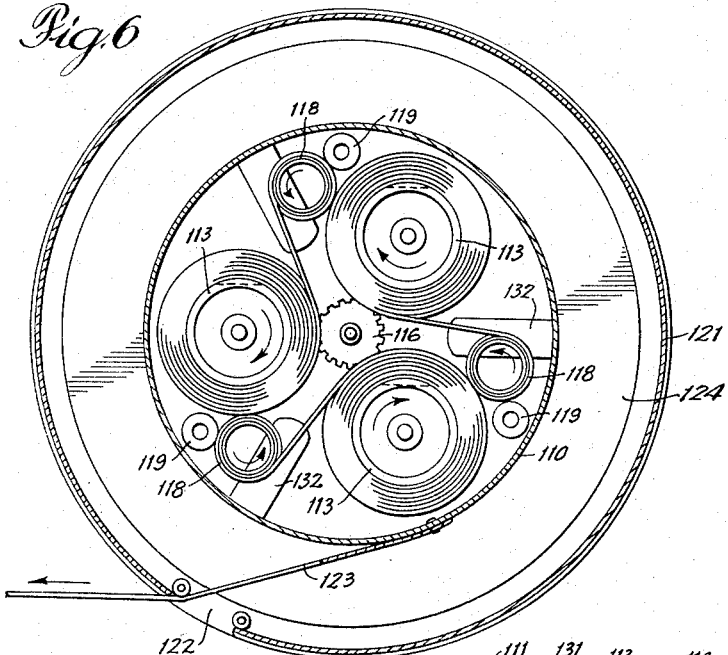
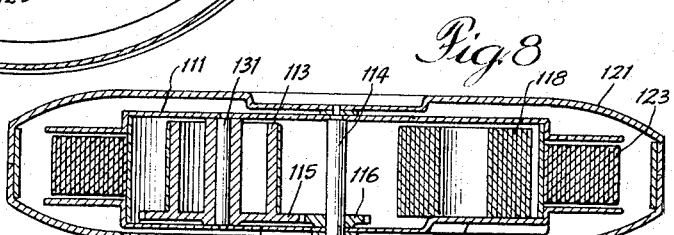
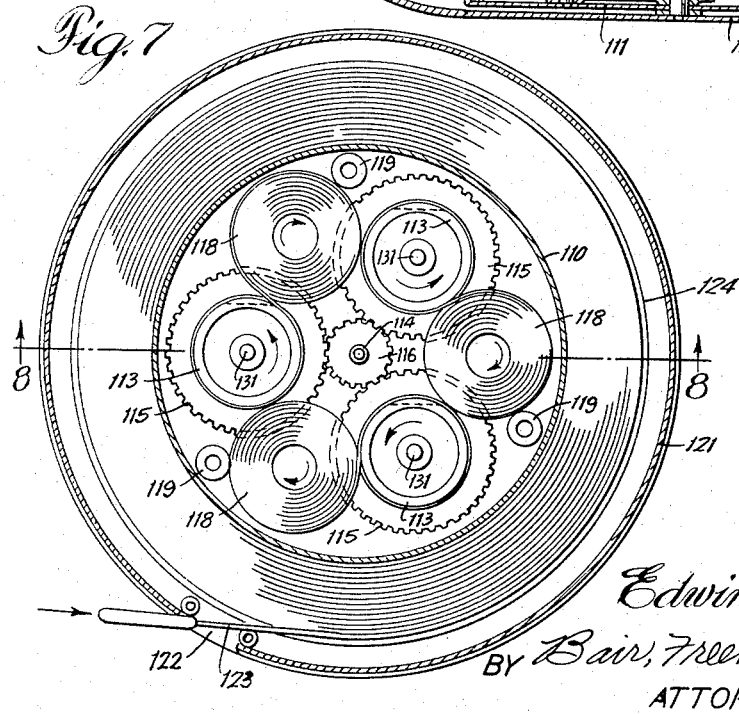

United States Patent Office 2,869,801
Patented Jan. 20, 1959

2,869,801
SPRING MOTOR
Edwin E. Foster, Austin, Tex.

Application February 18, 1957, Serial No. 640,923

12 Claims. (Cl. 242—107.3)

This invention relates to spring motors and more particularly to multiple spring motors and to a retractable tape employing such a motor.

There are many uses for retractable tapes, reels, of various types, motion picture cameras, and the like, which require a spring motor capable of producing a high degree of torque over a large number of turns and in which the space for mounting the motor is limited. Single spring motors not only become too large for such uses, but are symmetrically unbalanced so that in cases where the motor turns, as in the case of tapes, an undesirable unbalance is created. Multiple spring motors, as heretofore constructed, also require a large amount of space and tend to produce fouling of the springs if suddenly released under low load conditions.

It is one of the objects of the present invention to provide a spring motor of the multiple spring type in which maximum power is realized in minimum space, which is in symmetrical balance at all times and in which there is no tendency of the springs to foul.

Another object is to provide a spring motor in which the springs are in the form of loosely mounted storage coils and are individually back-wound on drums with each storage coil engaging and rolling against the surface of one of the drums which turns in the same direction as the engaging surface of the storage coil.

According to a feature of the invention, guide rollers are provided spaced from the drums and engaging the storage coils to hold them in proper position for rolling against the drums.

A further object is to provide a spring motor in which drums are rotatably mounted in a housing symmetrically spaced from a center shaft and drivably connected to the center shaft to be turned simultaneously as the center shaft turns relative to the casing. Storage coils are loosely mounted in the housing to remain in engagement with the drum surfaces at all times.

A still further object is to provide a spring motor for a retractable tape in which the motor housing serves as a drum on which the tape is wound and is rotatably mounted in a casing to enclose the tape and other parts.

According to a feature of the invention, the housing provides a dirt-proof enclosure for the springs and gearing.

Another object of the invention is to provide a spring motor for retractable tapes in which a simple brake is provided for the housing in the form of a lever extending through the casing with one end spring pressed into engagement with the housing and the other terminating in a fingerpiece adjacent the center of the casing.

The above and other objects and features of the invention will be more readily apparent from the following description when read in connection with the accompanying drawing, in which:

Figure 1 is a transverse section through a retractable tape equipped with a spring motor embodying the invention showing the tape fully withdrawn from the casing;

Figure 2 is a similar view showing the tape fully retracted;

Figure 3 is a partial section on the line 3—3 of Figure 1;

Figure 4 is a similar section on the line 4—4 of Figure 2;

Figure 5 is a partial section on the line 5—5 of Figure 3 showing the connecting gearing;

Figures 6 and 7 are views corresponding to Figures 1 and 2, respectively, of an alternative construction, and Figure 8 is a section on the line 8—8 of Figure 7.

The spring motor, as shown in Figures 1 to 5, comprises a cylindrical housing 10 having flat ends 11 and a cylindrical end wall 12. The housing is adapted to contain a plurality of simultaneously acting springs and in the embodiment shown in Figures 1 to 5, two springs are employed. In this construction there are two take-up drums 13 symmetrically mounted for rotation on axes on opposite sides of a center shaft 14 rotatably mounted in the casing and extending through the opposite ends 11 thereof. Each of the take-up drums carries a gear or pinion 15 and the two pinions 15 mesh with a center pinion 16 secured to the center shaft 14. In this way, when the center shaft turns relative to the casing, the drums will turn about their axes simultaneously in the same direction of rotation.

The drums 13 function as take-up drums for a pair of spring strips 17 which are identical and which are biased to coil upon themselves in the form of storage coils, as shown at 18. The bias of the springs is preferably so varied that each increment of the spring strip will be deflected from its normal biased position through the same angle as it is back-wound on the drum and preferably will be biased to the full elastic limit of the material, as more particularly described in my co-pending application Serial No. 595,290. The ends of the spring strips are connected to the drums 13, respectively, and the storage coils 18 lie loosely in the housing 10 so that they can move freely in the housing. In the operation of the unit, the upper storage coil 18, which is connected to the left-hand drum 13, will engage and ride against the outer surface of the right-hand drum 13 and the lower storage coil, which is connected to the right-hand drum, will engage and ride against the outer surface of the left-hand drum 13. To hold the storage coils properly positioned and to prevent them from riding into engagement with the side wall of the housing, guide rollers 19 are rotatably mounted in the housing spaced from the drums to engage and guide the adjacent storage coils.

For embodiment in a retractable tape, the housing 10 may serve as a drum on which the tape is wound. For this purpose, as shown in Figures 1 to 5, the housing is rotatably mounted in an outer casing 21 which is formed on one side with an opening 22 through which a tape 23 may pass. The housing 10 may be formed with spaced annular flanges 24 serving as guide flanges for the tape so that it will be wound on the cylindrical periphery of the housing between the guide flanges in a straight regular coil. The housing may be rotatably supported in the casing by extending the center shaft 14 beyond the ends of the housing and securing the projecting ends thereof to the casing to hold the shaft against rotation relative to the casing.

To control winding and unwinding of the tape brake means are provided which, as shown, comprise a lever 25 extending through an opening in the outer casing near the central portion thereof and pivoted intermediate its ends on a pivot 26 within the outer casing. The end of the lever within the casing carries a friction element 27 which is pressed into engagement with one of the flanges 24 by a spring 28 exerting sufficient force to hold the housing against turning in response to the spring motor. Thus, when the tape is pulled out the brake mechanism will hold it in its extended position for use. When the tape is to be rewound, the outer end of the lever 25, which terminates in a fingerpiece 29 near the center of the outer casing, may be depressed to move the friction element away from the flange 24 so that the housing is free to rotate to rewind the tape.

When the tape is fully retracted into the casing, the parts will be in the condition shown in Figure 2 with the tape fully retracted and substantially all of the spring strips being coiled in the storage coils 18. At this time, the storage coils are relatively large, but since the drums 13 are substantially empty, they are relatively small so that there is adequate room within the housing for the storage coils. When the tape is withdrawn, the housing will be turned clockwise, as seen in Figures 1 and 2, carrying the drums around with it and the drums will be caused to rotate clockwise about their own axes by the gears 15 and 16. During this operation, the spring strips will be drawn from the storage coils and back-wound on the drums, that is, wound in a direction which will flex them opposite to their normal bias. As the drums and storage coils turn, each storage coil will remain in engagement with the outer surface of the opposite drum and it will be seen that the surfaces of the drums and storage coils at their points of engagement are turning in the same direction at the same linear speed. At the same time, the storage coils will ride against the guide rollers 19 which will hold them away from the inner wall of the housing and in engagement with the drums. When the tape is fully withdrawn, as shown in Figure 1, the storage coils will be reduced to minimum size containing only one or two turns of spring strip and the drums will be built up to maximum size with substantially all of the spring strip wound thereon. However, since the storage coils decrease in size as the drums increase, sufficient space will be provided within the housing to contain the drums and storage coils without interference with each other and in a minimum space.

When the brake is released to rewind the tape, the spring strips will tend to force themselves from the drums and to recoil in the storage coils. Even if the tape is allowed to rewind very rapidly, the coils will remain tight with no tendency toward fouling since the engaging surfaces of the storage coils and drums tend to hold the springs in place as they rewind without any likelihood of becoming loose or fouling regardless of the speed of rewinding. When springs are employed of the type referred to above, a substantially constant torque will be exerted throughout the full rewinding operation so that the tape will be uniformly drawn into the casing and wound on the housing. At the same time, through the use of multiple springs with relatively small drums as shown and as referred to in my co-pending application Serial No. 595,290, a large number of turns of the housing will be produced with a minimum total length of spring and with a high torque.

Instead of using only two springs, it may be desirable in some cases to employ more springs to obtain maximum torque in substantially the same space. I have found that for such uses three springs provide the optimum condition to obtain the greatest torque in the smallest space. A unit employing three springs, but substantially similar in other respect to the unit of Figures 1 to 5, is shown in Figures 6 to 8, with parts therein corresponding to like parts in Figures 1 to 5 being indicated by the same reference numerals, plus 100.

In this construction, the casing 121 may correspond to the casing 21 of Figures 1 to 5 and the housing 110 may be constructed in the same manner and mounted in the casing in the same manner. The drums 113 of Figures 6 to 8 are shown as molded plastic drums formed with integral internal hubs to fit rotatably over spindles 131 fixedly mounted in the housing 110 and having the gears 115 integrally molded therewith. As shown in Figures 6 and 8, the lower end of the housing is provided with inwardly projecting lands 132 which lie between the gears 115 and support the storage coils and the spring strips in proper alignment with the drums so that the spring strips will be wound on the drums without interference with the gears.

The center shaft 114 is secured in the outer casing in the same manner as in Figures 1 to 5 and carries a center pinion 116 meshing with the several gears 115. This construction functions in the same manner as in Figures 1 to 5 with the same advantages, but with the additional torque provided by the use of three springs in place of two.

While two embodiments of the invention have been shown and described herein, it will be understood that they are illustrative only and not to be taken as a definition of the scope of the invention, reference being had for this purpose to the appended claims.

What is claimed is:

1. A spring motor comprising a plurality of take-up drums rotatably mounted in symmetrically spaced relation about a central axis, a plurality of spring strips normally biased to coil themselves into storage coils lying loosely adjacent to the drums, means connecting the ends of the strips to the drums respectively, and means to turn the drums simultaneously about their axes in a direction to backwind the strips from the storage coils onto the drums, each of the storage coils engaging the surface of an adjacent drum which is moving in the same direction as the surface of the storage coil to roll thereagainst during winding and unwinding and being constrained thereby against rotation around the drum on which it is being wound.

2. The construction of claim 1 including a roller mounted on an axis parallel to and spaced from the axis of each of the drums to engage a storage coil and hold it in engagement with a drum.

3. A spring motor comprising a housing, a shaft mounted centrally of the housing and rotatable relatively thereto, a plurality of take-up drums rotatably mounted in the housing on axes parallel to and symmetrically spaced from the shaft, a plurality of spring strips biased to coil themselves into storage coils lying loosely in the housing, means connecting the ends of the strips to the drums respectively, and means drivably connecting the shaft and the drums so that when the shaft turns in one direction relative to the housing the spring strips will be backwound on the drums, each of the storage coils engaging the surface of an adjacent drum which is moving in the same direction as the surface of the storage coil to roll thereagainst during winding and unwinding.

4. The spring motor of claim 3 in which said means drivably connecting the shaft and drums comprises a gear on the shaft and gears on the drums meshing with the gear on the shaft.

5. The spring motor of claim 3 including guide rollers mounted in the housing spaced from each of the drums to engage the storage coils and hold them in engagement with the drums.

6. The spring motor of claim 3 in which the bias of each of the spring strips varies lengthwise thereof in such a manner that when backwound each increment of the strip will be deflected from its normal biased position through the same angle.

7. A spring motor comprising a housing, a shaft mounted centrally of the housing and rotatable relatively thereto, a pair of take-up drums rotatably mounted in the housing on diametrically opposite sides of the shaft, a pair of spring strips biased to coil themselves into storage coils lying loosely in the housing on opposite sides of the shaft, means connecting the ends of the strips to the drums respectively, and means drivably connecting the shaft and the drums to turn the drums in a direction to backwind the strips thereon when the shaft is turned in one direction relative to the housing, each storage coil engaging the surface of the drum to which the strip forming the other storage coil is connected to roll thereagainst during winding and unwinding.

8. The spring motor of claim 7 including a pair of rollers in the housing spaced from the drums respectively to engage the storage coils and hold them in engagement with the drums.

9. A spring motor comprising a housing, a shaft rotatably mounted centrally of the housing, three take-up drums rotatably mounted in the housing symmetrically spaced from the shaft, three spring strips biased to coil themselves into storage coils loosely mounted in the housing and lying respectively between adjacent pairs of drums, and means drivably connecting the shaft and the drums to turn the drums in a direction to backwind the strips thereon when the shaft is turned in one direction relative to the housing, each storage coil engaging the surface of a drum adjacent to the drum to which the strip forming such storage coil is connected to roll thereagainst as the drums and storage coils turn.

10. The spring motor of claim 9 including three guide rollers mounted in the housing spaced from the drums respectively to engage the storage coils and hold them in engagement with the drums.

11. A spring motor for a retractable tape comprising an outer hollow casing, a shaft extending centrally through the casing and rigidly secured thereto, a hollow housing in the casing rotatably mounted on the shaft and having an external cylindrical surface on which a tape may be wound, a plurality of take-up drums rotatably mounted in the housing symmetrically spaced around the shaft, a plurality of spring strips normally biased to coil themselves into storage coils mounted loosely in the housing, means connecting the ends of the strips to the drums respectively, and means drivably connecting the drums to the shaft to turn the drums in a direction to backwind the strips thereon when the housing is turned around the shaft in a direction to unwind tape therefrom, each of the storage coils engaging the surface of a drum other than the drum to which it is connected to roll thereagainst during winding and unwinding of the springs.

12. The construction of claim 11 including a brake lever extending through an opening in and pivoted to the casing and terminating in a fingerpiece centrally of and outside the casing, and a spring urging the other end of the lever into engagement with the housing to hold it against rotation.

References Cited in the file of this patent

UNITED STATES PATENTS

| | | |
|---|---|---|
| 2,063,799 | Fornelius et al. | Dec. 8, 1936 |
| 2,673,694 | Howell | Mar. 30, 1954 |